(12) United States Patent
Chen

(10) Patent No.: US 11,997,524 B2
(45) Date of Patent: *May 28, 2024

(54) BASE STATION SIDE DEVICE AND METHOD FOR WIRELESS COMMUNICATION, AND USER SIDE DEVICE AND METHOD FOR WIRELESS COMMUNICATION

(71) Applicant: Sony Group Corporation, Tokyo (JP)

(72) Inventor: Jinhui Chen, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,128

(22) Filed: Mar. 10, 2022

(65) Prior Publication Data

US 2022/0201529 A1 Jun. 23, 2022

Related U.S. Application Data

(60) Continuation of application No. 16/839,087, filed on Apr. 3, 2020, now Pat. No. 11,277,762, which is a
(Continued)

(30) Foreign Application Priority Data

Aug. 14, 2015 (JP) .......................... 201510502495.2

(51) Int. Cl.
*H04W 24/10* (2009.01)
*H04L 5/00* (2006.01)

(52) U.S. Cl.
CPC ........... *H04W 24/10* (2013.01); *H04L 5/0023* (2013.01); *H04L 5/0048* (2013.01); *H04L 5/0091* (2013.01); *H04L 5/0032* (2013.01)

(58) Field of Classification Search
CPC .... H04W 24/10; H04L 5/0048; H04L 5/0032; H04L 5/0023; H04L 5/0091
See application file for complete search history.

(56) References Cited

U.S. PATENT DOCUMENTS

| 7,580,729 B2 * | 8/2009 | Ozluturk | H04B 7/0695 455/445 |
| 9,031,029 B2 * | 5/2015 | Iwai | H04J 13/0062 370/329 |

(Continued)

FOREIGN PATENT DOCUMENTS

| CN | 102056220 A | 5/2011 |
| CN | 102149124 A | 8/2011 |

(Continued)

OTHER PUBLICATIONS

Office Action dated Jun. 15, 2020 in Chinese Patent Application No. 201510502495.2, 11 pages.
(Continued)

*Primary Examiner* — Parth Patel
(74) *Attorney, Agent, or Firm* — XSENSUS LLP

(57) ABSTRACT

The disclosure provides a base station side device and method for wireless communication, and a UE side device and method for wireless communication. The base station side device for wireless communication includes: a determination unit configured to dynamically determine, on the basis of a transmission characteristic relevant to a user equipment, a reference signal to be used by the user equipment from a reference signal set available for a base station; and a generation unit configured to generate reference signal configuration information for the user equipment, wherein the configuration information includes an indication for indicating the sequence number of the reference signal to be used by the user equipment, and the sequence number of the (Continued)

reference signal is relevant to the sequence number of an antenna port.

20 Claims, 8 Drawing Sheets

Related U.S. Application Data division of application No. 15/742,941, filed as application No. PCT/CN2016/091910 on Jul. 27, 2016, now Pat. No. 10,659,985.

(56) References Cited

U.S. PATENT DOCUMENTS

| | | | |
|---|---|---|---|
| 9,419,760 B2 | 8/2016 | Nagata et al. | |
| 9,572,063 B2 | 2/2017 | Etemad et al. | |
| 9,806,780 B2 * | 10/2017 | Ji | H04B 7/0486 |
| 9,923,613 B2 * | 3/2018 | Lee | H04B 7/0413 |
| 9,924,381 B2 * | 3/2018 | Siomina | H04W 64/00 |
| 9,924,528 B2 * | 3/2018 | Lee | H04B 7/0626 |
| 10,009,163 B2 * | 6/2018 | Shimezawa | H04L 5/0053 |
| 10,033,497 B2 * | 7/2018 | Luo | H04L 5/0094 |
| 10,051,509 B2 * | 8/2018 | Zhu | H04W 28/0268 |
| 10,200,100 B2 * | 2/2019 | Kim | H04B 7/0639 |
| 2010/0056217 A1 | 3/2010 | Montojo et al. | |
| 2010/0238821 A1 | 9/2010 | Liu et al. | |
| 2011/0141987 A1 | 6/2011 | Nam et al. | |
| 2011/0211490 A1 | 9/2011 | Nikula et al. | |
| 2011/0292847 A1 * | 12/2011 | Yoon | H04B 7/0626 370/280 |
| 2012/0057562 A1 | 3/2012 | Kim et al. | |
| 2012/0069869 A1 | 3/2012 | Jeong et al. | |
| 2012/0213113 A1 * | 8/2012 | Zhao | H04B 7/024 370/252 |
| 2012/0220238 A1 * | 8/2012 | Hosoya | H04B 7/06 455/63.4 |
| 2013/0142163 A1 | 6/2013 | Liu et al. | |
| 2013/0201942 A1 | 8/2013 | Kim et al. | |
| 2013/0316719 A1 * | 11/2013 | Mazzarese | H04L 5/0048 455/450 |
| 2014/0036796 A1 | 2/2014 | Etemad et al. | |
| 2014/0056279 A1 * | 2/2014 | Chen | H04W 36/0007 370/329 |
| 2014/0066116 A1 | 3/2014 | Gao et al. | |
| 2014/0105057 A1 * | 4/2014 | Liu | H04L 43/12 370/252 |
| 2014/0177745 A1 | 6/2014 | Krishnamurthy et al. | |
| 2014/0200012 A1 * | 7/2014 | Ito | H04W 24/02 455/450 |
| 2014/0321414 A1 | 10/2014 | Chun et al. | |
| 2014/0355597 A1 | 12/2014 | Yeh et al. | |
| 2015/0003393 A1 * | 1/2015 | Xia | H04W 8/06 370/329 |
| 2015/0023199 A1 | 1/2015 | Ishida et al. | |
| 2015/0049704 A1 | 2/2015 | Park et al. | |
| 2015/0063287 A1 | 3/2015 | Mazzarese et al. | |
| 2015/0085787 A1 | 3/2015 | Ouchi | |
| 2015/0124673 A1 | 5/2015 | Ouchi et al. | |
| 2015/0124732 A1 | 5/2015 | Seo et al. | |
| 2015/0181374 A1 | 6/2015 | Tsuda | |
| 2015/0222403 A1 | 8/2015 | Kim et al. | |
| 2015/0223254 A1 | 8/2015 | Guo et al. | |
| 2015/0229450 A1 * | 8/2015 | Noh | H04L 5/0051 370/329 |
| 2015/0237617 A1 * | 8/2015 | Chen | H04B 7/0626 370/329 |
| 2015/0282192 A1 * | 10/2015 | Shin | H04L 1/0047 370/329 |
| 2015/0288497 A1 | 10/2015 | Li et al. | |
| 2015/0289281 A1 * | 10/2015 | Kim | H04L 5/0023 375/267 |
| 2015/0304994 A1 * | 10/2015 | Kim | H04L 27/2601 370/280 |
| 2015/0327315 A1 | 11/2015 | Xue et al. | |
| 2015/0341806 A1 * | 11/2015 | Ito | H04L 5/005 455/450 |
| 2016/0100384 A1 | 4/2016 | Etemad et al. | |
| 2016/0112099 A1 | 4/2016 | Lee et al. | |
| 2016/0119936 A1 | 4/2016 | Kim et al. | |
| 2016/0135194 A1 | 5/2016 | Kim et al. | |
| 2016/0156401 A1 | 6/2016 | Onggosanusi et al. | |
| 2016/0157287 A1 | 6/2016 | Chae et al. | |
| 2016/0204921 A1 * | 7/2016 | Kim | H04B 7/10 370/312 |
| 2016/0219570 A1 * | 7/2016 | Guo | H04W 72/046 |
| 2016/0226644 A1 * | 8/2016 | Gaal | H04W 72/21 |
| 2016/0233938 A1 * | 8/2016 | Mondal | H04W 72/0453 |
| 2016/0234830 A1 * | 8/2016 | Kim | H04W 72/563 |
| 2016/0248559 A1 | 8/2016 | Guo et al. | |
| 2016/0254893 A1 * | 9/2016 | Yang | H04B 7/0619 370/329 |
| 2016/0262161 A1 * | 9/2016 | Li | H04L 5/0051 |
| 2016/0285605 A1 * | 9/2016 | Andersson | H04L 5/0048 |
| 2016/0301511 A1 * | 10/2016 | Yoon | H04L 5/0057 |
| 2016/0315745 A1 * | 10/2016 | Kim | H04L 5/0023 |
| 2016/0337881 A1 * | 11/2016 | Zhang | H04B 7/0626 |
| 2016/0338050 A1 | 11/2016 | Kim et al. | |
| 2017/0019882 A1 | 1/2017 | Nimbalker et al. | |
| 2017/0019883 A1 | 1/2017 | Nimbalker et al. | |
| 2017/0078067 A1 * | 3/2017 | Sun | H04L 5/0048 |
| 2017/0099090 A1 * | 4/2017 | Liu | H04L 1/06 |
| 2017/0202014 A1 | 7/2017 | Moon et al. | |
| 2017/0208500 A1 | 7/2017 | Jung et al. | |
| 2017/0279585 A1 * | 9/2017 | Yang | H04L 5/0053 |
| 2017/0302338 A1 * | 10/2017 | Lyu | H04B 7/0695 |
| 2017/0318565 A1 | 11/2017 | Prasad et al. | |
| 2017/0324456 A1 | 11/2017 | Prasad et al. | |
| 2018/0006697 A1 * | 1/2018 | Song | H04B 7/0619 |
| 2018/0006784 A1 * | 1/2018 | Su | H04B 7/0695 |
| 2018/0020441 A1 * | 1/2018 | Lo | H04W 40/244 |
| 2018/0041417 A1 * | 2/2018 | Liu | H04L 1/1896 |
| 2018/0048498 A1 | 3/2018 | Sun et al. | |
| 2018/0069613 A1 * | 3/2018 | Li | H04B 7/0617 |
| 2018/0070316 A1 | 3/2018 | Choi et al. | |
| 2018/0076946 A1 * | 3/2018 | Li | H04W 72/0446 |
| 2018/0083752 A1 | 3/2018 | Kim et al. | |
| 2018/0091273 A1 * | 3/2018 | Choi | H04L 5/005 |
| 2018/0092118 A1 * | 3/2018 | Kim | H04W 28/0278 |
| 2018/0124743 A1 | 5/2018 | Seo et al. | |
| 2018/0124816 A1 * | 5/2018 | Han | H04L 1/1893 |
| 2018/0132125 A1 * | 5/2018 | Li | H04W 24/10 |
| 2018/0145740 A1 * | 5/2018 | Tani | H04L 1/0003 |
| 2018/0160361 A1 | 6/2018 | Yi et al. | |
| 2018/0175983 A1 * | 6/2018 | Yum | H04L 5/0053 |
| 2018/0176809 A1 * | 6/2018 | Gao | H04L 5/0057 |
| 2018/0192397 A1 | 7/2018 | Seo | |
| 2018/0206211 A1 | 7/2018 | Seo et al. | |
| 2018/0234278 A1 | 8/2018 | Xu et al. | |
| 2018/0248601 A1 * | 8/2018 | Kishiyama | H04B 7/0417 |
| 2019/0104549 A1 * | 4/2019 | Deng | H04L 27/2607 |
| 2019/0174554 A1 * | 6/2019 | Deenoo | H04L 5/0048 |
| 2019/0222338 A1 * | 7/2019 | Iwai | H04J 13/0062 |
| 2020/0236576 A1 * | 7/2020 | Chen | H04L 5/0048 |

FOREIGN PATENT DOCUMENTS

| | | |
|---|---|---|
| CN | 102377532 A | 3/2012 |
| CN | 103220068 A | 7/2013 |
| CN | 103391576 A | 11/2013 |
| WO | 2014/069821 A1 | 5/2014 |
| WO | 2015/076712 A1 | 5/2015 |

OTHER PUBLICATIONS

Nortel, "Discussion on RS Design for Higher-order MIMO in LTE-A," 3GPP TSG-RAN Working Group 1 Meeting #56bis, R1-091591, Mar. 23-27, 2009, 7 pages.

ETRI, "Discussion on OM RS for Uplink SU-MIMO in LTE-A," 3GPP TSG RAN WG1 Meeting #58bis, R1-094311, Oct. 12-16, 2009, 9 pages.

(56) References Cited

OTHER PUBLICATIONS

International Search Report dated Oct. 31, 2016 in PCT/CN2016/091910, filed on Jul. 27, 2016.

\* cited by examiner

BASE STATION SIDE DEVICE AND METHOD FOR WIRELESS COMMUNICATION, AND USER SIDE DEVICE AND METHOD FOR WIRELESS COMMUNICATION

CROSS-REFERENCE TO RELATED APPLICATIONS

This application is a continuation of U.S. application Ser. No. 16/839,087, filed Apr. 3, 2020, which is a divisional of U.S. application Ser. No. 15/742,941, filed Jan. 9, 2018 (now U.S. Pat. No. 10,659,985), which is based on PCT filing PCT/CN2016/091910, filed Jul. 27, 2016, which claims priority to CN 201510502495.2, filed Aug. 14, 2015, each of which is incorporated herein by reference in its entirety.

FIELD OF THE INVENTION

Embodiments of the present disclosure generally relate to the field of wireless communications, and in particular to a device and a method at a base station side for wireless communications, and a device and a method at a user equipment side for wireless communications with which reference signals are flexibly configured.

BACKGROUND OF THE INVENTION

In the existing 3GPP, reference signals are allocated continuously and fixedly, that is, reference signals for user equipment are transmitted via several fixed antenna ports. For example, if there are 4 antenna ports, the reference signals are simultaneously transmitted via antenna ports 15 to 18, and the user equipment for example may measure channels corresponding to the four ports and feeds channel status information back to a base station. In a large scale antenna system, a base station has a large number of antennas, and the user equipment may use only a portion of the reference signals. In this case, a more flexible reference signal notification solution is required.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

A device at a base station side for wireless communications is provided according to an aspect of the present disclosure. The device includes: a determination unit, configured to determine dynamically, based on transmission characteristics related to a user equipment, a reference signal to be used by the user equipment from a set of available reference signals of the base station; and a generation unit, configured to generate reference signal configuration information for the user equipment, with the configuration information containing an indication of a sequence number of the reference signal to be used by the user equipment, where the sequence number of the reference signal is associated with a sequence number of an antenna port.

A device at a user equipment side for wireless communications is provided according to another aspect of the present disclosure. The device includes: a determination unit, configured to determine, based on reference signal configuration information for the user equipment from a base station, a sequence number of a reference signal to be used by the user equipment; and a transceiving unit, configured to transmit and receive the reference signal based on an antenna port associated with the sequence number of the reference signal.

A method at a base station side in a wireless communication system is provided according to an aspect of the present disclosure. The method includes: determining dynamically, based on transmission characteristics related to a user equipment, a reference signal to be used by the user equipment from a set of available reference signals of a base station; and generating reference signal configuration information for the user equipment, with the configuration information containing an indication of a sequence number of the reference signal to be used by the user equipment, where the sequence number of the reference signal is associated with a sequence number of an antenna port.

A method at a user equipment side for wireless communications is provided according to another aspect of the present disclosure. The method includes: determining, based on reference signal configuration information for the user equipment from a base station, a sequence number of a reference signal to be used by the user equipment; and transmitting and receiving the reference signal based on an antenna port associated with the sequence number of the reference signal.

A wireless communication system is further provided according to another aspect of the present disclosure. The system includes a base station and a user equipment. The base station includes the device at the base station side in the above wireless communication system, and the user equipment include the device at the user equipment side in the above wireless communication system.

According to other aspects of the present disclosure, there are also provided computer program codes and computer program products for implementing the above mentioned methods at the base station side and at the user equipment side in the wireless communication system and a computer readable storage medium in which computer program codes for implementing the above mentioned methods at the base station side and at the user equipment side in the wireless communication system are recorded.

In embodiments of the present disclosure, by dynamically determining the reference signal to be used by the user equipment and generating the corresponding reference signal configuration information, the reference signal to be used by the user equipment can be flexibly configured, so that the reference signal is adapted to the transmission characteristics of the user equipment.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1:
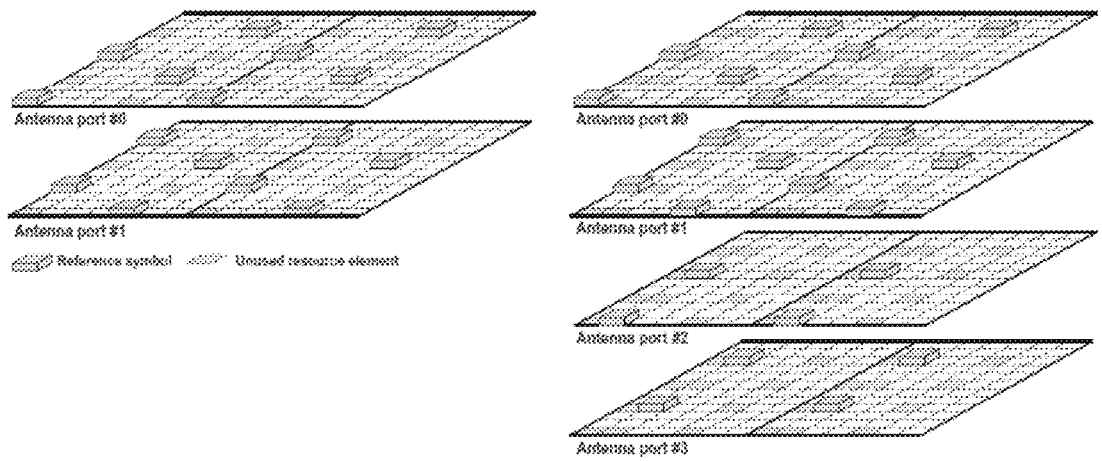
FIG. 1 shows a diagram of an example of a correspondence between cell-specific reference signals (CS-RSs) and antenna ports in LTE.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As described in the above, in the prior art, the using conditions of reference signals and further antenna ports to be used are determined by the number of used reference signals. In this case, it is desired to improve the flexibility in configuring the reference signals to adapt to an application scenario of dynamically changing the reference signal configuration. Particularly, in the case of a large scale antenna system, a user equipment may only need to use a portion of antenna ports. Therefore, different cases need to be distinguished instead of applying a single and complete reference signal configuration, to save transmission resources and signaling overheads as much as possible.

After performing a series of processing on transmission blocks of dynamic sizes from MAC layer, such as performing CRC insertion, segmentation, channel encoding, rate matching and physical layer hybrid ARQ, bit-level scrambling code and data modulation on the transmission blocks one by one, a base station performs an antenna mapping on obtained modulation symbols to transmit the modulation symbols to a user equipment. During the antenna mapping, the modulation symbols are processed jointly and the processing result is mapped to different antenna ports. It should be noted that, the antenna ports herein may correspond to physical antenna elements, or have more general meanings. For example, for a downlink, the antenna ports may be considered to correspond to transmission of reference signals. The reference signals (sometimes referred to as pilots) generally contain known signals being not subjected to signal processing such as modulation, and for example may be used for channel estimations, coherent demodulations or the like for data transmission at corresponding antenna ports. In an example, the user equipment performs the channel estimation based on a downlink reference signal received from a specified antenna port and feeds channel status information such as information on channel quality and information on channel direction back to the base station. If a same reference signal is transmitted from multiple physical antenna elements, then these physical antenna elements correspond to a single antenna port. Similarly, if two different reference signals are transmitted from a same group of physical antenna elements, they are also considered to correspond to two different antennal ports.

FIG. 1 shows a diagram of an example of a correspondence between cell-specific reference signals (CS-RSs) and antenna ports in LTE. It is shown a case of two antennal ports on the left side of FIG. 1, and a case of four antenna ports on the right side of FIG. 1. It can be seen that, each of the downlink antenna ports is configured to transmit one CS-RS, and different CS-RSs are transmitted by using different resource elements. Therefore, it may be regarded that the reference signals correspond to the antenna ports.

It should be understood that, although CS-RS is taken as an example for illustration here, other reference signals such as channel status information reference signal (CSI-RS) and demodulation reference signal (DMRS) have similar correspondence.

More generally, it may be further considered that, in and only in the case where two received signals are transmitted from a same antenna port, the two received signals are considered to experience the same overall channel. The antenna port is defined such that, a channel via which symbols at the antenna port are transmitted can be derived from a channel via which other symbols at the same antenna port are transmitted. In this case, it may be further considered that the reference signals or antenna ports correspond to channels or sub-channels.

Therefore, configuring the reference signals is equivalent to configuring the channels or sub-channels to be used by the user equipment, and an appropriate channel or sub-channel can be configured for the user equipment by improving the flexibility in configuring the reference signals.

Figure 2:
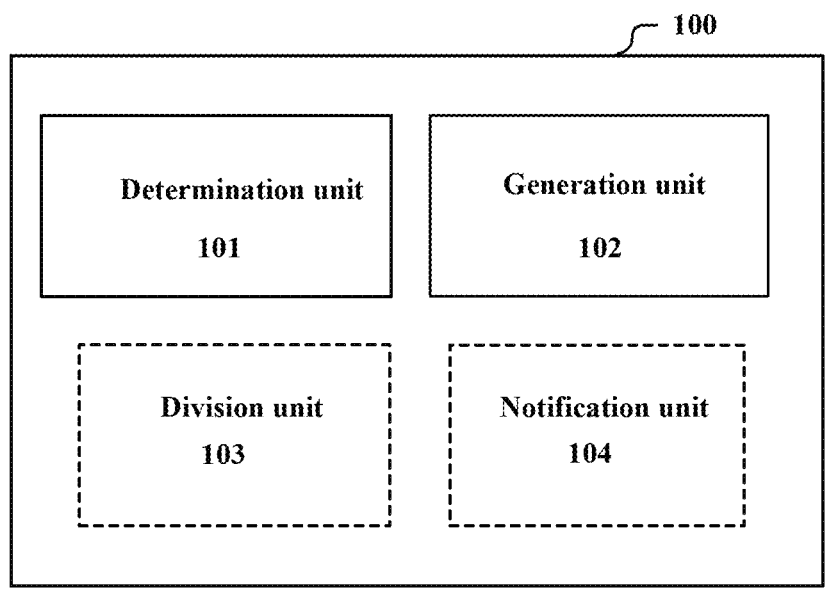
FIG. 2 shows a structural block diagram of a device at a base station side in a wireless communication system according to an embodiment of the present disclosure.

In order to improve the flexibility in configuring the reference signals, it is provided according to an embodiment of the present disclosure a device 100 at a base station side for wireless communications, and a structural block diagram of the device 100 is shown in FIG. 2. The device 100 includes: a determination unit 101, configured to determine dynamically, based on transmission characteristics related to a user equipment, a reference signal to be used by the user equipment from a set of available reference signals of a base station; and a generation unit 102, configured to generate reference signal configuration information for the user equipment, with the configuration information containing an indication of a sequence number of the reference signal to be used by the user equipment, where the sequence number of the reference signal is associated with a sequence number of an antenna port.

By dynamically selecting the reference signal based on the transmission characteristics related to the user equipment, for example, it is beneficial for selecting an appropriate channel, i.e., an appropriate antenna port, for transmitting the reference signal. In this case, not only the flexibility in configuring the reference signals can be improved, but also it is beneficial for achieving objects such as interference coordination and transmission quality assurance. In an example, the transmission characteristics include at least one of device parameters, transmission requirements, a channel status, interference conditions, a geographical location and the like, of the user equipment.

The reference signal configuration information generated by the device 100 contains the indication of the sequence number of the reference signal to be used by the user equipment. The sequence number of the reference signal is associated with the sequence number of the antenna port. The sequence numbers and such association may be previously defined and known by the base station and the user equipment. For example, the sequence number of the reference signal corresponds to the sequence number of the antenna port. For example, a reference signal with a sequence number of 1 corresponds to an antenna port 15, and a reference signal with a sequence number of 2 corresponds to an antenna port 16, and so on. In this case, once obtaining the reference signal configuration information, the user equipment can learn configuration information of an antenna port via which the reference signal is to be transmitted and received.

The above reference signal may be a downlink reference signal. For example, the reference signal is at least one of the following downlink reference signals: a CSI-RS and a downlink DMRS. The determination unit 101, for example, selects an appropriate downlink reference signal based on an uplink channel status and the like of the user equipment. The uplink channel status, for example, may be estimated by receiving an uplink reference signal transmitted by the user equipment. The downlink transmission characteristics are obtained by using reciprocity between uplink and downlink channels and the downlink reference signal is selected. The generation unit 102 generates reference signal configuration information based on a sequence number of the selected downlink reference signal. After obtaining the reference signal configuration information, the user equipment obtains a sequence number of the downlink reference signal and performs a channel status measurement, channel estimation or the like based on the downlink reference signal. In an example, the reference signal may be a beam-formed reference signal, that is, a reference signal which is subjected to the beam-forming processing. In this example, reference signals with different sequence numbers are transmitted to the user equipment via beams in different directions. Since the beam itself has directivity, when it is necessary to feedback channel status information, the user equipment only needs to report channel quality information (such as $CQI_{Beam1}$, $CQI_{Beam2}$, ..., $CQI_{Beamn}$) corresponding to beam-formed reference signals over one beam (such as a beam with the best quality) or more beams (such as beams with the top n best qualities, with n being configured by a high level signaling of the base station), without the need of specifically feeding back channel direction information (such as pre-coding matrix indication, PMI). Accordingly, the base station can determine a channel direction status from the base station to the user equipment based on the channel quality reports over the respective beams. The base station may transmit the beam-formed reference signal in multiple predetermined directions, or may determine, based on distribution of geographical locations of currently-connected user equipment, multiple directions capable of covering these user equipment, to transmit the beam-formed reference signal.

The above reference signal may be an uplink reference signal. For example the reference signal may be at least one of the following uplink reference signals: a sounding reference signal (SRS) and an uplink DMRS. Similarly, the determination unit 101, for example, may select an appropriate uplink reference signal based on a geographical location, interference conditions and the like of the user equipment. The generation unit 102 generates reference signal configuration information based on a sequence number of the selected uplink reference signal. After obtaining the reference signal configuration information, the user equipment obtains the sequence number of the uplink reference signal and transmits the corresponding uplink reference signal.

The determination unit 101 may determine a reference signal to be used by a particular user equipment served by the base station. In other words, the reference signal is particular to the user equipment and may be changed dynamically. In such example, an appropriate reference signal configuration can be selected based on specific situations of user equipment, so as to improve the performance of channel estimation. In addition, overheads in for example operation and energy consumption can be reduced since the user equipment does not need to monitor all of the reference signals. For example, in a current LTE system, a base station transmits CSI-RS to all user equipment via antenna ports 15 to 22, and the user equipment may measure all of the CSI-RS over all of the eight antenna ports and feedbacks corresponding channel statuses. According to the example in the present disclosure, in the case that the transmission characteristics related to a first user equipment and a second user equipment, the base station may instruct the first user equipment to only measure the CSI-RS transmitted via the antenna ports 15 to 18, and instruct the second user equipment to only measure the CSI-RS transmitted via the antenna ports 19 to 22. In this way, the amounts of measuring operations of the first and second user equipment are respectively reduced to half of that of the conventional user equipment. It should be noted that, in the case where the base station serves multiple user equipment, reference signals particular to the user equipment may be only configured for a portion of the user equipment, while still adopting conventional manners for the remaining user equipment. Accordingly, the user equipment may, for example, determine measuring objects of the user equipment based on whether the reference signal configuration information is received. If the reference signal configuration information is not received by the user equipment, the user equipment still measures reference signals over the multiple fixed antenna ports. In this example, since the reference signal configuration is particular to a user, preferably, the base station notifies a user equipment of reference signal configuration information for the user equipment via dedicated signaling (such as RRC signaling), thereby ensuring that the user equipment receives the indication accurately and in time.

In addition, the determination unit 101 may determine a same reference signal for all user equipment served by (a certain cell of) the base station. For example, a portion of reference signals are selected from a predetermined reference signal set and are used by all user equipment. In other words, user equipment served by one cell of each base station transmit the reference signals via a same set of antenna ports, while another base station adjacent to the above base station transmits reference signals via another set of antenna ports other than the above set, thereby coordinating reference signals/antenna ports between the base stations. Similarly, the reference signal may also be dynamically changed. For example, a first base station and a second base station adjacent to each other may exchange their respective antenna port utilization conditions with each other via X2 signaling between base stations, thereby avoiding overlapping antenna ports and reducing interference. For example, after the coordination between the base stations, the first base station transmits CSI-RS to user equipment served by the first base station only via the antenal ports 15 to 18, while the second base station transmits CSI-RS to user equipment served by the second base station only via the antenna ports 19 to 22. This example is particularly adapted to application scenarios in which unlicensed frequency band resources are used, such as Licensed-Assisted-Access (LAA). For a cellular network, different from the licensed frequency band, the unlicensed frequency band (such as television frequency band and WiFi frequency band) is not allocated in advance among base stations according to a certain rule. In this case, the base stations each have opportunities to use resources of the unlicensed frequency band. If adjacent base stations respectively transmit reference signals using the unlicensed frequency band via a same fixed antenna port, then the adjacent base stations may seriously interfere with each other. In this case, utilization efficiency of the unlicensed frequency band may be greatly improved with this example. In addition, in this example, the reference signal is particular to the cell. Preferably, the base station notifies the user equipment of reference signal configuration information via broadcast signaling (such as system information broadcast), thereby improving the efficiency of indicating.

In an example, the determination unit 101 may be further configured to determine an uplink reference signal to be used by the user equipment with respect to other user equipment served by the base station. That is, when determining the uplink reference signal to be used by the user equipment, the determination unit 101 considers uplink reference signals allocated to other user equipment served by the base station, thereby avoiding or alleviating interference between user equipment as much as possible or achieving other objects.

Alternatively, the determination unit 101 is configured to determine an uplink reference signal to be used by the user equipment served by the present base station with respect to user equipment served by another base station. Since user equipment served by different base stations may use a same uplink reference signal, the determination unit 101 may consider uplink reference signals used by the user equipment served by another base station when selecting the uplink reference signal to be used by the user equipment served by the present base station, thereby avoiding or alleviating interference between user equipment served by different cells or achieving other objects.

As an example, the generation unit 102 may generate a bitmap based on a sequence number of the reference signal to be used by the user equipment, and each bit of the bitmap represents whether a reference signal corresponding to the bit is to be used. For example, in the case that there are totally eight available reference signals (or antenna ports), the reference signal configuration information may be formed by an 8-bit bitmap. Exemplarily, if the reference signals to be used respectively have sequence numbers of 0, 5, 6 and 7, the generated bitmap is 11100001. Of course, the generation of bitmap is not limited thereto, and the bitmap may have other configurations such as using 0 to represent that a corresponding reference signal is to be used while using 1 to represent that a corresponding reference signal is not to be used.

By notifying the reference signal configuration via the bitmap, signaling overheads for various configurations may have the same length. Particularly, the signaling overhead can be effectively reduced in the case of a large number of reference signals.

As shown in a dashed line block in FIG. 2, the device 100 may further include a division unit 103, configured to divide all available reference signals into multiple subsets. The determination unit 101 may select at least a portion of reference signals in at least one of the subsets for each user equipment, respectively.

Figure 3:
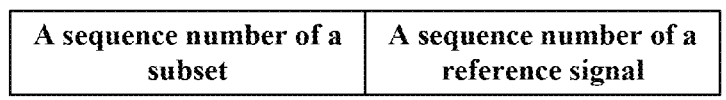
FIG. 3 shows an example of reference signal configuration information.

The reference signal configuration information includes a sequence number of the subset where the selected reference signal is located and a sequence number of the selected reference signal in the subset, as shown in FIG. 3. The available reference signals are divided into multiple subsets, and compared with taking all of the available reference signals as one set, the number of the reference signals in each of the subset is small. In this way, the sequence number of the reference signal may be represented in a simpler way. For example, the sequence number of the reference signal may be represented with the above mentioned bitmap. This example is particularly adapted to a system in which large scale antennas (such as Massive MIMO) are deployed at network side, thereby greatly reducing the complexity in configuring the antenal ports/reference signals.

Taking the downlink reference signal as an example, assuming that a multi-antenna base station has $2^N$ available downlink reference signals (i.e., $2^N$ antenna ports), and each of the downlink reference signals may be used by a user equipment for measuring one channel or sub-channel, that is, there may be $2^N$ channels or sub-channels for the user equipment. These $2^N$ downlink reference signals are divided into $2^M$ subsets, and a relation between M and N meets $0 \leq M < N$. In the case that sequence numbers of reference signals selected from the subset are represented with a bitmap, the length of the reference signal configuration information is $M+2^N/2^M$ bits, and the first M bits indicates a sequence number of the subset where the selected reference signal is located, and the last $2^N/2^M$ bits is a bitmap, with each bit of the bitmap being 0 or 1 for representing whether a downlink reference signal corresponding to the bit is used.

Assuming that the sequence number of the subset where the downlink reference signal selected by the base station is located is decimally represented as in, several reference signals are selected from the subset in and are represented with a bit string $b_i$ having a length of $2^N/2^M$ (a decimal value corresponding to the bit string is 1). In this case, the base station notifies the user equipment of a downlink reference signal configuration which is decimally represented as $1+2^{(N-M)}m$. That is, the user equipment needs to perform channel measurement on $\|b_i\|_1$ reference signals based on values of in and $b_i$, with $\|b_i\|_1$ representing the number of bits with the value of 1 in the bit string bi. The user equipment finds $\|b_i\|_1$ reference signals from the predefined $2^N$ downlink reference signals based on the reference signal configuration information, and performs the channel measurement based on these $\|b_i\|_1$ reference signals. The user equipment reports the measurement result to the base station, and the base station transmits data by selecting one of the channels corresponding to the $\|b_i\|_1$ reference signals based on the report from the user equipment, or by forming a channel with a portion or all of sub-channels corresponding to the $\|b_i\|_1$ reference signals.

For example, if N=10 and M=6, i.e., there are totally 1024 available downlink reference signals and they are divided into 64 subsets, each of the subsets includes 16 downlink reference signals. Each user equipment is allocated with reference signals in a certain subset, the quantity and sequence number of reference signals is unfixed. For example, in the case that the base station expects that the user equipment measures reference signals with sequence numbers of 0, 5, 8 and 10 in subset with sequence numbers of 3, the reference signal configuration information is 000011(corresponding to subset with sequence numbers of 3)+0000010100100001(corresponding to the reference signals with sequence numbers of 0, 5, 8 and 10 in the subset respectively), which totally occupies 22 bits.

In the above, an example that the reference signal configuration information includes the sequence number of the subset and a bitmap of the reference signals is provided. However, the reference signal configuration information may only include the bitmap of reference signals. In this case, it may be considered that there is one subset, i.e., the reference signals are not divided into subsets, and thus it is unnecessary to notify the sequence number of the subset. Alternatively, it is also possible to transmit only the sequence number of subset, and in this case, it is configured that the user equipment uses all reference signals in a certain subset.

In the case that the reference signals are selected from multiple subsets by the determination unit 102, for example, multiple pieces of reference signal configuration information may be generated, with each piece of reference signal configuration information including a reference signal in one subset. The multiple pieces of reference signal configuration information, for example, may be notified to the user equipment in multiple times.

As shown in another dashed line block in FIG. 2, the device 100 may further include a notification unit 104 configured to notify the user equipment of the reference signal configuration information. In an example, the notification unit 104 is configured to perform the notification via a high level signaling. For example, the high level signaling is RRC signaling.

In summary, the device 100 dynamically determines the reference signal to be used by the user equipment, thereby improving the flexibility in configuring the reference signals.

Second Embodiment

Figure 4:
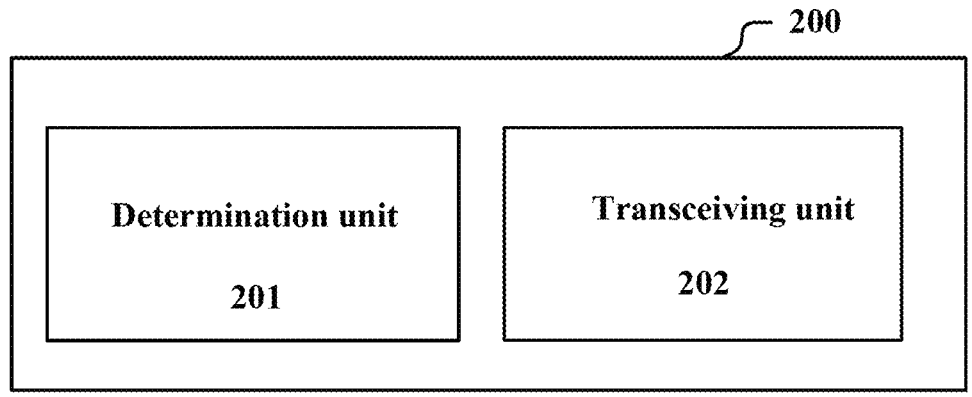
FIG. 4 shows a structural block diagram of a device at a user equipment side in a wireless communication system according to an embodiment of the present disclosure.

FIG. 4 shows a structural block diagram of a device 200 at a user equipment side for wireless communications according to an embodiment of the present disclosure. The device 200 includes a determination unit 201 and a transceiving unit 202. The determination unit 201 is configured to determine, based on reference signal configuration information for the user equipment from a base station, a sequence number of a reference signal to be used by the user equipment, and the transceiving unit 202 is configured to transmit and receive the reference signal based on an antenna port associated with the sequence number of the reference signal.

In an example, sequence numbers of reference signals correspond to sequence numbers of antenna ports. The determination unit 201 may determine the sequence number of the antenna port based on the sequence number of the reference signal according to the correspondence.

In the case that the reference signal is a downlink reference signal, the user equipment measures a channel status based on the received reference signal. For example, the transceiving unit 202 may report the measurement result to the base station, so that the base station selects a channel for data transmission for the user equipment. The downlink reference signal includes but is not limited to the CSI-RS and downlink DMRS.

In addition, the reference signal may be an uplink reference signal such as SRS and uplink DMRS. In this case, the user equipment transmits the determined reference signal via the transceiving unit 202.

In an example, the transceiving unit 202 is further configured to receive the reference signal configuration information via a high level signaling. The high level signaling may be RRC signaling.

The reference signal configuration information may include a bitmap generated based on the sequence number of the reference signal to be used by the user equipment, and each bit of the bitmap represents whether a reference signal corresponding to the bit is to be used. The generation of the bitmap is described in detail in the first embodiment, and is not repeated herein.

In an example, available reference signals are divided into multiple subsets, and the reference signal configuration information represents at least a portion of reference signals in at least one of the subsets. In this case, the reference signal configuration information may include a sequence number of the subset where the selected reference signal is located and a sequence number of the selected reference signal in the subset. In the case that the reference signals are selected from multiple subsets, the base station may generate the reference signal configuration information for the reference signals in each subset, and transmit the generated reference signal configuration information to the user equipment in multiple times. Accordingly, the transceiving unit 202 receives the reference signal configuration information for multiple times to obtain complete reference signal configuration information, and the determination unit 202 determines the sequence number of the reference signal to be used by the user equipment based on the complete reference signal configuration information.

The specific examples related to the reference signal configuration information are described in detail in the first embodiment, and are not repeated herein.

In summary, the device 200 can dynamically select the reference signal to be used by determining the reference signal to be used before transmitting and receiving the reference signal, thereby improving the flexibility.

Third Embodiment

In the process of describing the devices at a base station side and at a user equipment side in a wireless communication system in the embodiments described above, obviously, some processing and methods are also disclosed. Hereinafter, an overview of the methods is given without repeating some details disclosed above. However, it should be noted that, although the methods are disclosed in a process of describing the devices at a base station side and at a user equipment side in a wireless communication system, the methods do not certainly employ or are not certainly executed by the aforementioned components. For example, the embodiments of the devices at a base station side and at a user equipment side in a wireless communication system may be partially or completely implemented with hardware and/or firmware, the methods described below may be executed by a computer-executable program completely, although the hardware and/or firmware of the devices at a base station side and at a user equipment side in a wireless communication system can also be used in the methods.

Figure 5:
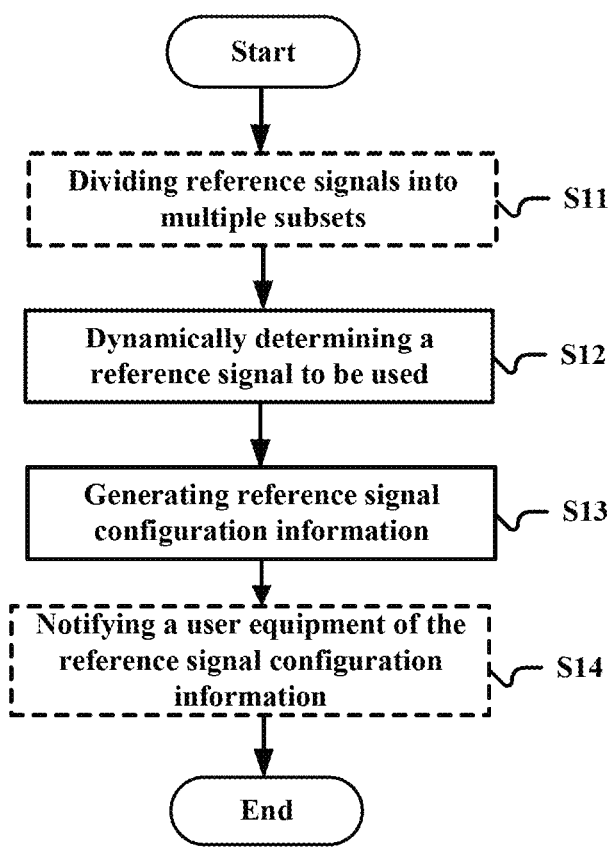
FIG. 5 shows a flowchart of a method at a base station side in a wireless communication system according to an embodiment of the present disclosure.

FIG. 5 shows a flowchart of a method at a base station side in a wireless communication system according to an embodiment of the present disclosure. The method includes: determining dynamically, based on transmission characteristics related to a user equipment, a reference signal to be used by the user equipment from a set of available reference signals of a base station (S12); and generating reference signal configuration information for the user equipment (S13), with the configuration information containing an indication of a sequence number of the reference signal to be used by the user equipment, where the sequence number of the reference signal is associated with a sequence number of an antenna port.

The transmission characteristics include at least one of: device parameters, transmission requirements, a channel status, interference conditions and a geographical location of the user equipment.

For example, the reference signal may be at least one of the following downlink reference signals: channel status information reference signal CSI-RS and downlink demodulation reference signal DMRS. Alternatively, the reference signal may be a beam-formed reference signal. As another example, the reference signal may be at least one of the following uplink reference signals: sounding reference signal SRS and uplink demodulation reference signal DMRS.

In step S12, a reference signal to be used by each user equipment served by the base station may be determined. Alternatively, in step S12, a same reference signal may be determined for all user equipment served by the base station. As another example, in step S12, a reference signal to be used by the user equipment is determined with respect to other user equipment served by the base station. As yet another example, in step S12, a reference signal to be used by the user equipment served by the present base station is determined with respect to user equipment served by another base station.

In step S13, a bitmap may be generated based on the sequence number of the reference signal to be used by the user equipment, and each bit of the bitmap represents whether a reference signal corresponding to the bit is to be used.

Moreover, as shown in a dashed line block in FIG. 5, the above method may further include step S11: dividing all available reference signals into multiple subsets. In this case, at least a portion of reference signals in at least one of the subsets may be selected for each user equipment in step S12, and reference signal configuration information generated in step S13 includes a sequence number of the subset where the selected reference signal is located and a sequence number of the selected reference signal in the subset. The sequence number of the selected reference signal in the subset may be represented with a bitmap. In the case that reference signals are selected from multiple subsets, multiple pieces of reference signal configuration information may be generated and notified to the user equipment piece by piece in multiple times.

As shown in another dashed line block in FIG. 5, the above method may further include step S14: notifying the user equipment of the reference signal configuration information. For example, the notification may be performed via a high level signaling such as RRC signaling.

Figure 6:
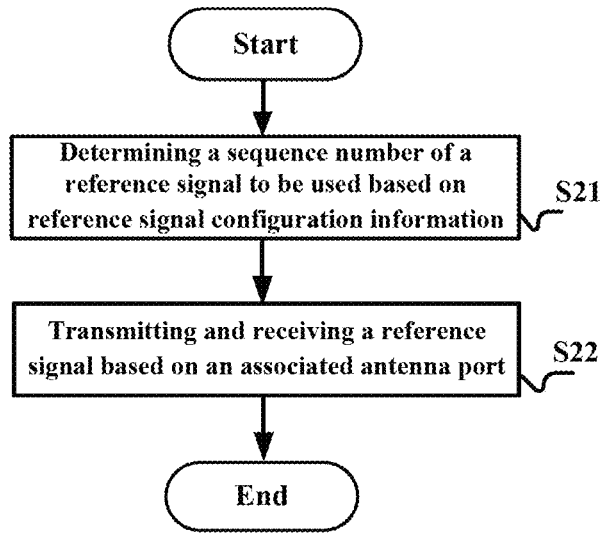
FIG. 6 shows a flowchart of a method at a user equipment side in a wireless communication system according to an embodiment of the present disclosure.

FIG. 6 shows a flowchart of a method at a user equipment side for wireless communications according to an embodiment of the present disclosure. The method includes: determining, based on reference signal configuration information for the user equipment from a base station, a sequence number of a reference signal to be used by the user equipment (S21); and transmitting and receiving the reference signal based on an antenna port associated with the sequence number of the reference signal (S22).

The reference signal may be a downlink reference signal, for example, at least one of CSI-RS and downlink DMRS. The user equipment measures a channel status based on the received reference signal. Alternatively, the reference signal may be an uplink reference signal such as SRS and uplink DMRS, and the user equipment transmits the reference signal based on an antenna port associated with the sequence number of the reference signal.

The reference signal configuration information may be received by receiving the high level signaling such as RRC signaling. In an example, the reference signal configuration information includes a bitmap generated based on the sequence number of the reference signal to be used by the user equipment, and each bit of the bitmap represents whether a reference signal corresponding to the bit is to be used.

All available reference signals may be divided into multiple subsets, and the reference signal configuration information represents at least a portion of reference signals in at least one of the subsets. In this case, the reference signal configuration information may include a sequence number of the subset where the selected reference signal is located and a sequence number of the selected reference signal in the subset. In the case that the reference signals are selected from multiple subsets, the base station may generate multiple pieces of reference signal configuration information, and the user equipment receives these pieces of reference signal configuration information piece by piece in multiple times and determines the sequence number of the reference signal to be used based on all the received pieces of reference signal configuration information.

Figure 7:
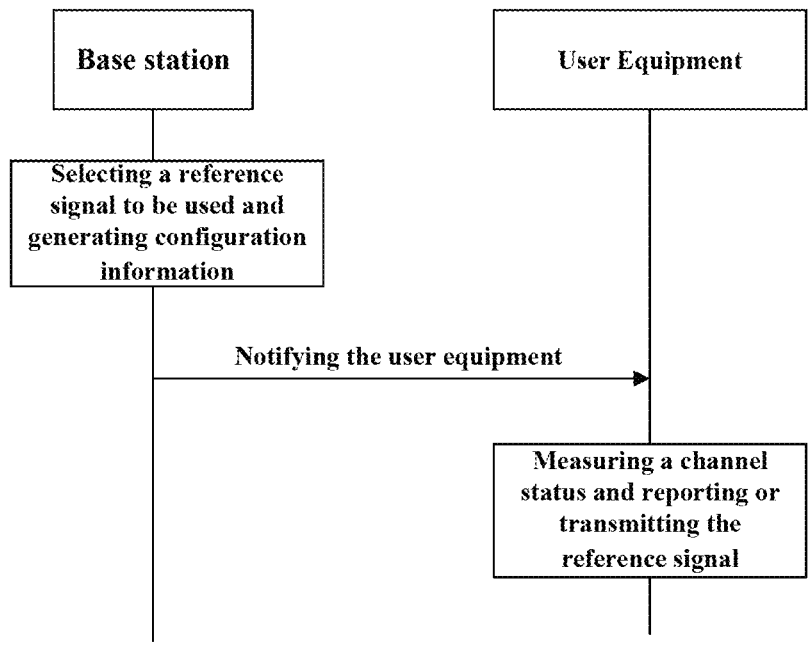
FIG. 7 shows a diagram of an example of an information procedure between a base station and a user equipment.

For ease of understanding, FIG. 7 shows an example of an information procedure between a base station and a user equipment. As shown in FIG. 7, the base station firstly dynamically determines a reference signal to be used by the user equipment from a set of available reference signals, based on transmission characteristics related to the user equipment, and generates reference signal configuration information including an indication of a sequence number of the reference signal to be used by the user equipment. The sequence number of the reference signal is associated with a sequence number of an antenna port (for example, the sequence number of the reference signal is corresponding to the sequence number of the antenna port). Then, the base station notifies the user equipment of the generated reference signal configuration information. The user equipment determines the sequence number of the reference signal to be used by the user equipment based on the received reference signal configuration information, obtains the sequence number of the antenna port associated with the sequence number of the reference signal based on the sequence number of the reference signal, and then transmits and receives the reference signal based on the corresponding antenna port. For example, in a case that the reference signal is a downlink reference signal, the user equipment measures a channel status of a corresponding channel; in a case that the reference signal is an uplink reference signal, the user equipment transmits the selected uplink reference signal.

It is to be noted that, the above methods can be used separately or in conjunction with each other. The details have been described in detail in the first and second embodiments, and are not repeatedly described here.

In addition, in the above description, it is further disclosed a communication system including a base station and a user equipment, where the base station includes the device 100 and the user equipment includes the device 200.

The technology of the present disclosure may be applied to various products. For example, the base station may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals may each operate as the base station by temporarily or semi-persistently executing a base station function.

For example, the user equipment may be implemented as a mobile terminal such as a smartphone, a tablet personal computer (PC), a notebook PC, a portable game terminal, a portable/dongle type mobile router, and a digital camera, or an in-vehicle terminal such as a car navigation apparatus served by the base station. The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the above mentioned terminals.

APPLICATION EXAMPLES OF BASE STATION

First Application Example

Figure 8:
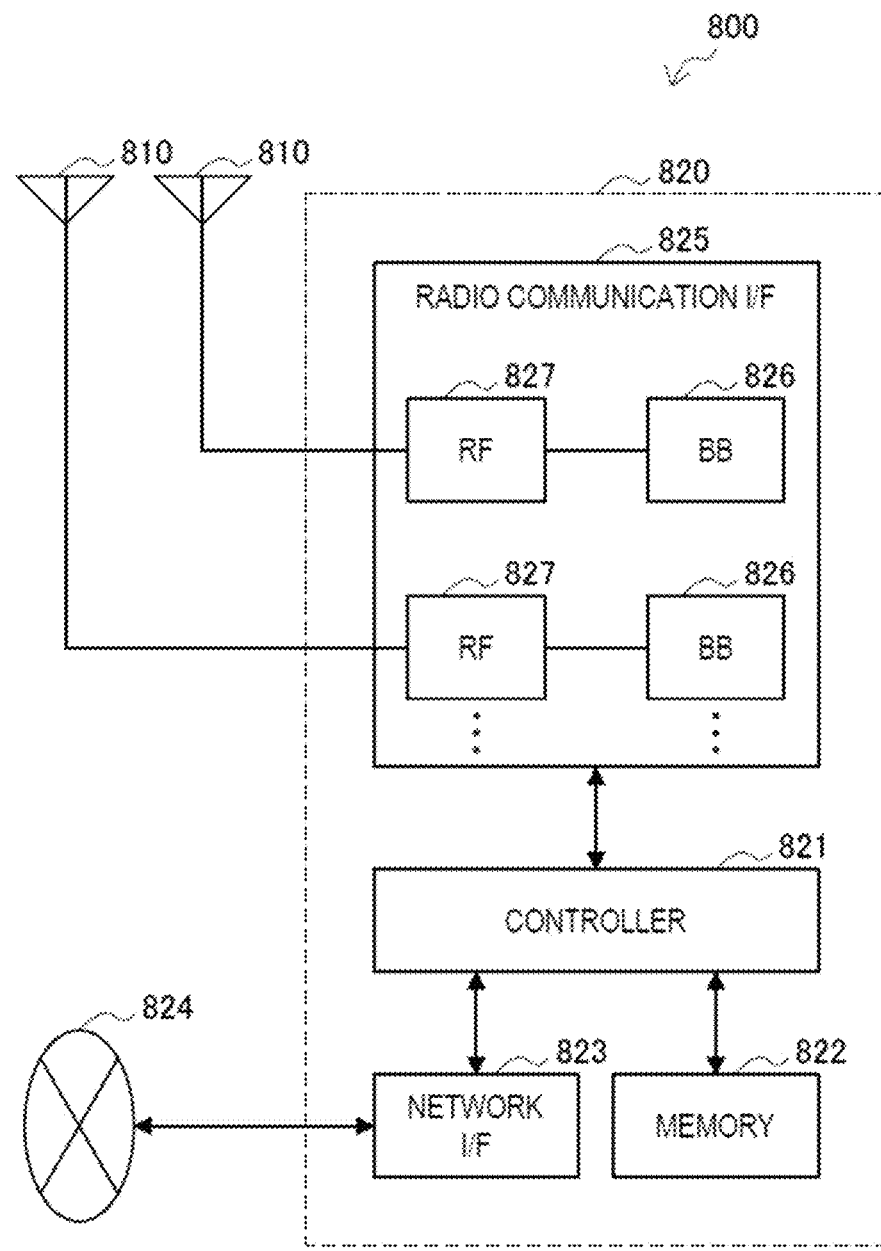
FIG. 8 is a block diagram showing a first example of a schematic configuration of an eNB in which the technology according to the present disclosure may be applied.

FIG. 8 is a block diagram showing a first example of a schematic configuration of an eNB in which the technology according to the present disclosure cam be applied. An eNB 800 includes a single or multiple antennas 810 and a base station device 820. The base station device 820 may be connected to each of the antennas 810 via an RF cable.

Each of the antennas 810 includes a single or multiple antennal elements (such as multiple antenna elements included in a multiple-input multiple-output (MIMO) antenna), and is for the base station device 820 to transmit and receive radio signals. As shown in FIG. 8, the eNB 800 may include multiple antennas 810. For example, the multiple antennas 810 may be compatible with multiple frequency bands used by the eNB 800. Although FIG. 8 shows the example in which the eNB 800 includes multiple antennas 810, the eNB 800 may include a single antenna 810.

The base station device 820 includes a controller 821, a memory 822, a network interface 823 and a radio communication interface 825.

The controller 821 may be for example a CPU or a DSP, and operates various functions of a high layer of the base station device 820. For example, the controller 821 generates a data package based on data in a signal processed by the radio communication interface 825, and transfers the generated package via the network interface 823. The controller 821 may bundle data from multiple baseband processors to generate a bundling package, and transfers the generated bundling package. The controller 821 may has a logical function for performing the following controls: radio resource control, radio bearer control, mobility management, admission control and scheduling. The control may be performed in conjunction with a nearby eNB or core network node. The memory 822 includes RAM and ROM, and stores programs to be executed by the controller 821 and various types of control data (such as terminal list, transmission power data and scheduling data).

The network interface 823 is a communication interface for connecting the base station device 820 to a core network 824. The controller 821 may communicate with a core network node or another eNB via the network interface 823. In this case, the eNB 800 may be connected with the core network node or other eNBs via a logic interface (such as interface S1 and interface X2). The network interface 823 may be a wired communication interface or a radio communication interface for wireless backhaul routing. If the network interface 823 is a radio communication interface, the network interface 823 may use a higher frequency band for radio communication as compared with that used by the radio communication interface 825.

The radio communication interface 825 supports any cellular communication scheme (such as Long Term Evolution (LTE) and LTE-advanced), and provides a radio connection to a terminal located in a cell of the eNB 800 via the antenna 810. The radio communication interface 825 may generally include for example a baseband (BB) processor 826 and an RF circuit 827. The BB processor 826 may perform for example coding/decoding, modulation/demodulation and multiplexing/demultiplexing, and performs various types of signal processing of layer (such as L1, Media Access Control (MAC), Radio Link Control (RLC) and Packet Data Convergence Protocol (PDCP)). Instead of the controller 821, the BB processor 826 may have a portion or all of the above logical functions. The BB processor 826 may be a memory storing communication control programs, or a module including a processor and a related circuit which are configured to execute programs. In this way, the function of the BB processor 826 may be changed when the programs are updated. The module may be a card or blade inserted into the slot of the base station device 820. Alternatively, the module may be a chip mounted on the card or the blade. Meanwhile, the RF circuit 827 may include for example frequency mixer, a filter and an amplifier, and transmit and receive a wireless signal via the antenna 810.

As shown in FIG. 8, the radio communication interface 825 may include multiple BB processors 826. For example, the multiple BB processors 826 may be compatible with the multiple frequency bands used by the eNB 800. As shown in FIG. 8, the radio communication interface 825 may include multiple RF circuits 827. For example, the multiple RF circuits 827 may be compatible with multiple antenna elements. Although an example in which the radio communication interface 825 includes multiple BB processors 826 and multiple RF circuits 827 is shown in FIG. 8, the radio communication interface 825 may include a single BB processor 826 and a single RF circuit 827.

Second Application Example

Figure 9:
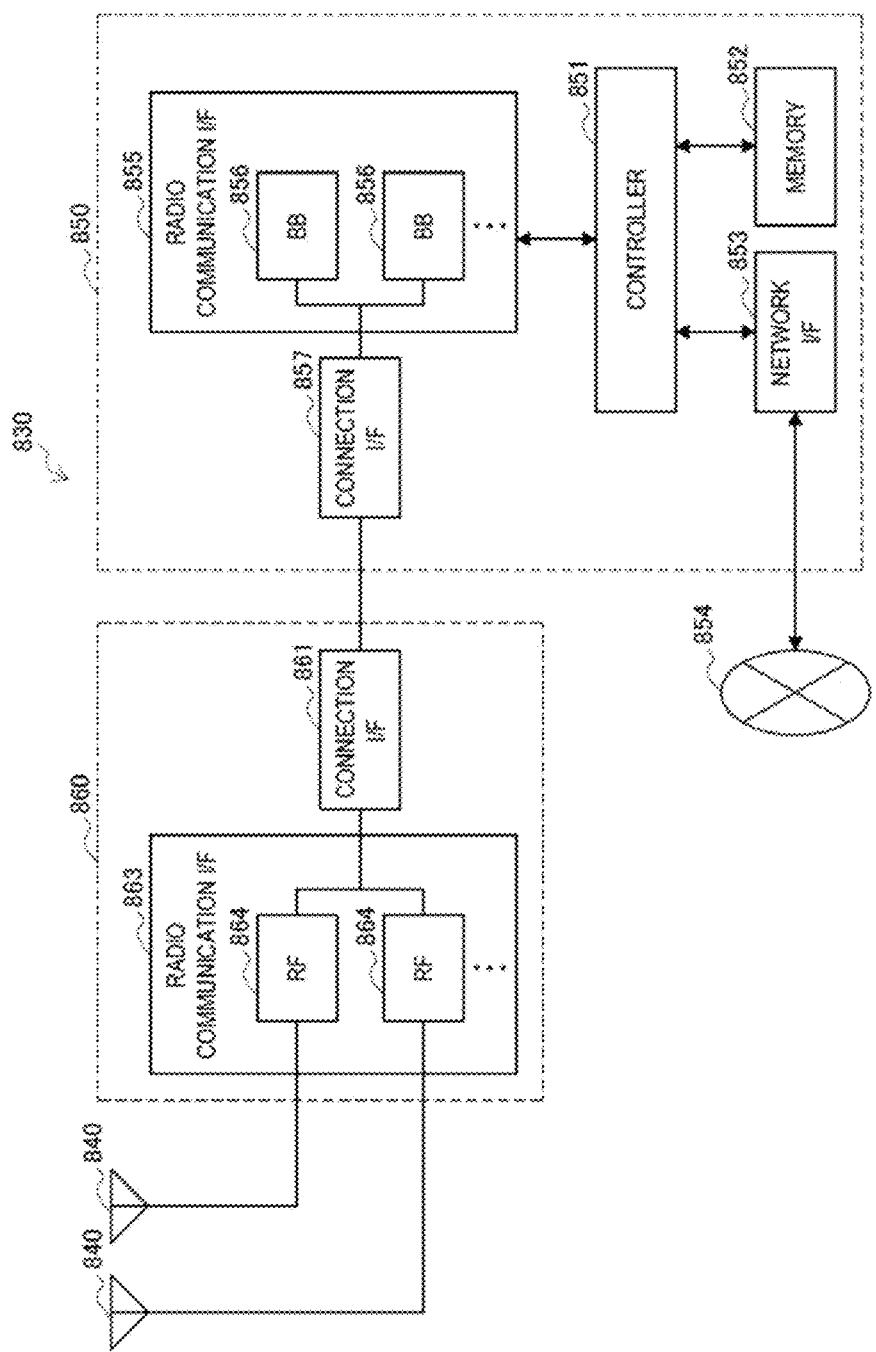
FIG. 9 is a block diagram showing a second example of a schematic configuration of an eNB in which the technology according to the present disclosure may be applied.

FIG. 9 is a block diagram showing a second example of a schematic configuration of an eNB in which the technology according to the present disclosure may be applied. An eNB 830 includes a single or multiple antennas 840, a base station device 850 and an RRH 860. The RRH 860 may be connected with each of the antennas 840 via an RF cable. The base station device 850 and RRH 860 may be connected to each other via a high-speed line such as fiber cable.

Each of the antennas 840 includes a single or multiple antennal elements (such as multiple antenna elements included in a multiple-input multiple-output (MIMO) antenna), and is for the RRH 860 to transmit and receive a wireless signal. As shown in FIG. 9, the eNB 830 may include multiple antennas 840. For example, the multiple antennas 840 may be compatible with multiple frequency bands used by the eNB 830. Although FIG. 9 shows the example in which the eNB 830 includes multiple antennas 840, the eNB 830 may include a single antenna 840.

The base station device 850 includes a controller 851, a memory 852, a network interface 853, a radio communication interface 855 and a connection interface 857. The controller 851, the memory 852 and network interface 853 are the same as the controller 821, memory 822 and network interface 823 described with reference to FIG. 8.

The radio communication interface 855 supports any cellular communication scheme (such as LTE and LTE-advanced), and provides a wireless communication to a terminal located in a sector corresponding to the RRH 860 via the RRH 860 and the antenna 840. The radio communication interface 855 may generally include for example a BB processor 856. The BB processor 856 is the same as the BB processor 826 described with reference to FIG. 8, except that the BB processor 856 is connected to an RF circuit 864 of the RRH 860 via the connection interface 857. As shown in FIG. 9, the radio communication interface 855 may include multiple BB processors 856. For example, the multiple BB processors 856 may be compatible with the multiple frequency bands used by the eNB 830. Although an example in which the radio communication interface 855 includes multiple BB processors 856 is shown in FIG. 9, the radio communication interface 855 may include a single BB processor 856.

The connection interface 857 is configured to connect the base station device 850 (radio communication interface 855) to the RRH 860. The connection interface 857 may be a communication module for connecting the base station device 850 (radio communication interface 855) to a communication in the above high-speed line of the RRH 860.

The RRH 860 includes a connection interface 861 and a radio communication interface 863.

The connection interface 861 is configured to connect the RRH 860 (radio communication interface 863) to the base station device 850. The connection interface 861 may be a communication module for the communication in the above high-speed line.

The radio communication interface 863 transmits and receives a wireless signal via the antenna 840. The radio communication interface 863 may generally include for example the RF circuit 864. The RF circuit 864 may include for example frequency mixer, a filter and an amplifier, and transmits and receives a wireless signal via the antenna 840. As shown in FIG. 9, the radio communication interface 863 may include multiple RF circuits 864. For example, the multiple RF circuits 864 may support multiple antenna elements. The radio communication interface 863 may include a single RF circuit 864 although the example in which the radio communication interface 863 includes multiple RF circuits 864 is shown in FIG. 9.

In the eNB 800 and eNB 830 respectively shown in FIG. 8 and FIG. 9, the notification unit 104 described with FIG. 2 can be implemented by the radio communication interface 825 and radio communication interface 855 and/or radio communication interface 863, and at least a portion of functions of the notification unit 104 can be implemented by the controller 821 and controller 851. For example, the controller 821 and controller 851 may perform a flexible configuration of reference signals by performing the functions of the determination unit 101, generation unit 102 and division unit 103.

APPLICATION EXAMPLES OF USER EQUIPMENT

First Application Example

Figure 10:
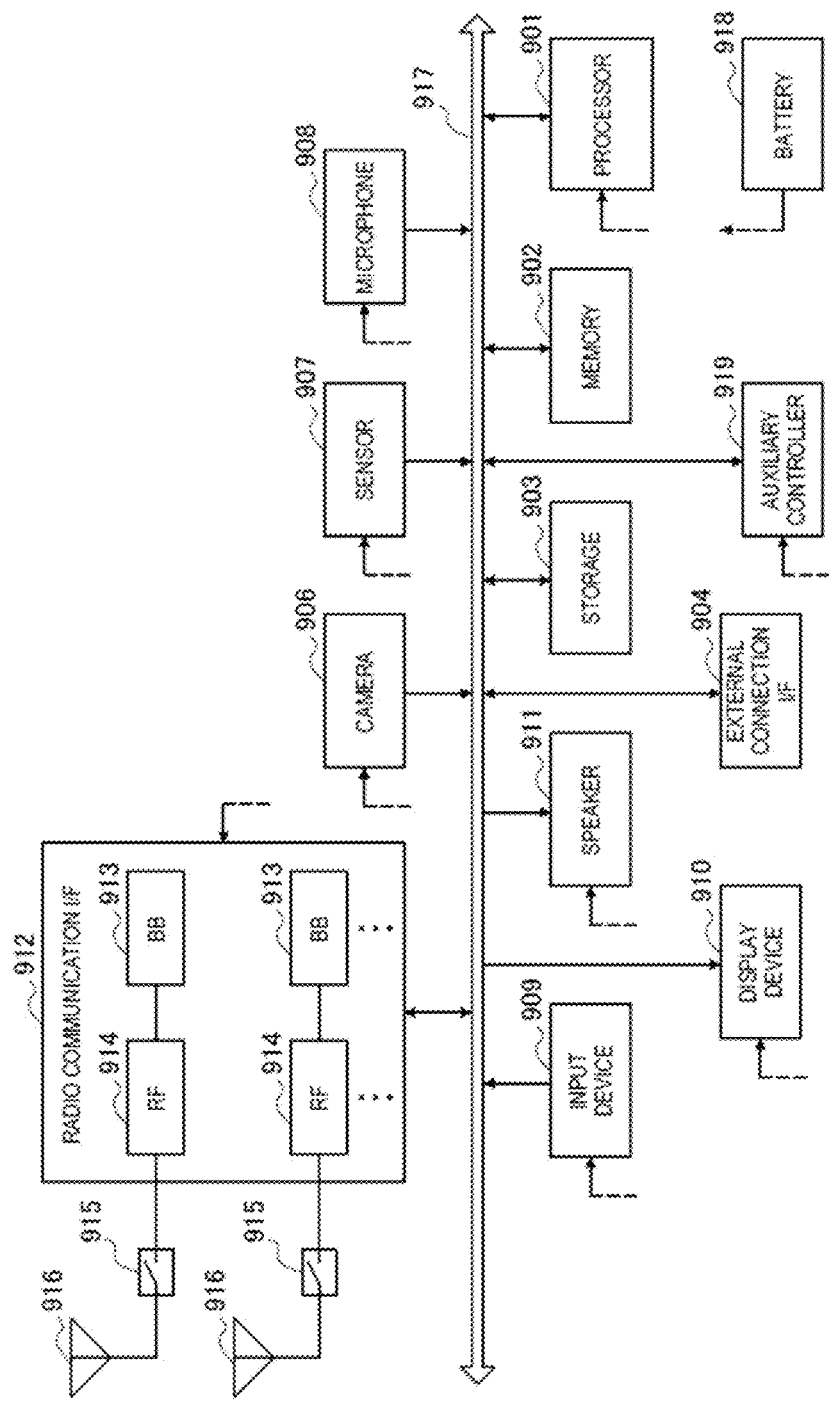
FIG. 10 is a block diagram showing an example of a schematic configuration of a smart phone in which the technology according to the present disclosure may be applied.

FIG. 10 is a block diagram showing an example of a schematic configuration of a smart phone 900 in which the technology according to the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, a single or multiple antenna switches 915, a single or multiple antennas 916, a bus 917, a battery 918 and an auxiliary controller 919.

The processor 901 may be for example a CPU or a system on chip (SoC), and controls functions of an application layer and an additional layer of the smart phone 900. The memory 902 includes RAM and ROM, and stores programs executed by the processor 901 and data. The storage 903 may include a storage medium such as a semiconductor memory and a hard disk. The external connection interface 904 refers to an interface connecting an external device (such as a memory card and a universal serial bus (USB) device) to the smart phone 900.

The camera 906 includes an image sensor (such as a charge-coupled device (CCD) and a complementary metal oxide semiconductor (CMOS)), and generates a captured image. The sensor 907 may include a group of sensors such as a measurement sensor, a gyroscope sensor, a geomagnetic sensor and an acceleration sensor. The microphone 908 converts voice inputted to the smart phone 900 into an audio signal. The input device 909 includes for example a touch sensor, a keypad, a keyboard, a button or a switch configured to detect touch on a screen of the display device 910, and receives an operation or information inputted by the user. The display device 910 includes a screen (such as a liquid crystal display (LCD) and an organic light-emitting diode (OLED) display), and displays an output image of the smart phone 900. The speaker 911 converts the audio signal outputted from the smart phone 900 into voice.

The radio communication interface 912 supports any cellular communication scheme (such as LTE and LTE-advanced), and performs a wireless communication. The radio communication interface 912 may include for example a BB processor 913 and an RF circuit 914. The BB processor 913 may perform for example coding/decoding, modulation/demodulation and multiplexing/demultiplexing, and perform various types of signal processing for wireless communication. Meanwhile, the RF circuit 914 may include for example a frequency mixer, a filter and an amplifier, and transmit and receive a wireless signal via the antenna 916. The radio communication interface 912 may be a chip module on which the BB processor 913 and the RE circuit 914 are integrated. As shown in FIG. 10, the radio communication interface 912 may include multiple BB processors 913 and multiple RF circuits 914. Although FIG. 10 shows the example in which the radio communication interface 912 includes multiple BB processors 913 and multiple RF circuits 914, the radio communication interface 912 may include a single BB processor 913 or a single RF circuit 914.

In addition to the cellular communication scheme, the radio communication interface 912 may support an additional type of wireless communication scheme, such as a short-distance wireless communication scheme, a near field communication scheme and a wireless local area network (LAN) scheme. In this case, the radio communication interface 912 may include a BB processor 913 and a RF circuit 914 for each of the wireless communication schemes.

Each of the antenna switches 915 switches a connection destination of the antenna 916 between multiple circuits (such as circuits for different radio communication schemes) included in the radio communication interface 912.

Each of the antennas 916 includes a single or multiple antenna elements (such as multiple antenna elements included in the MIMO antenna), and is for the radio communication interface 912 to transmit and receive a wireless signal. As shown in FIG. 10, the smart phone 900 may include multiple antennas 916. Although FIG. 10 shows the example in which the smart phone 900 includes multiple antennas 916, the smart phone 900 may include a single antenna 916.

In addition, the smart phone 900 may include antennas 916 for different radio communication schemes. In this case, the antenna switch 915 may be omitted in the configuration of the smart phone 900.

The processor 901, the memory 902, the storage 903, the external connection interface 904, the camera 906, the sensor 907, the microphone 908, the input device 909, the display device 910, the speaker 911, the radio communication interface 912 and the auxiliary controller 919 are connected with one another via the bus 917. The battery 918 supplies power to the modules of the smart phone 900 shown in FIG. 10 via a feeder line. The feeder line is partially shown with a dash line in the drawing. The auxiliary controller 919 operates a minimum necessary function of the smart phone 900 in a sleep mode.

In the smart phone 900 shown in FIG. 10, the transceiving unit 202 described in conjunction with FIG. 4 can be implemented by the radio communication interface 912. At least a portion of the functions of the transceiving unit 202 may be implemented by the processor 901 and the auxiliary controller 919. For example, the processor 901 or the auxiliary controller 919 may determine the sequence number of the reference signal by performing the function of the determination unit 201.

Second Application Example

Figure 11:
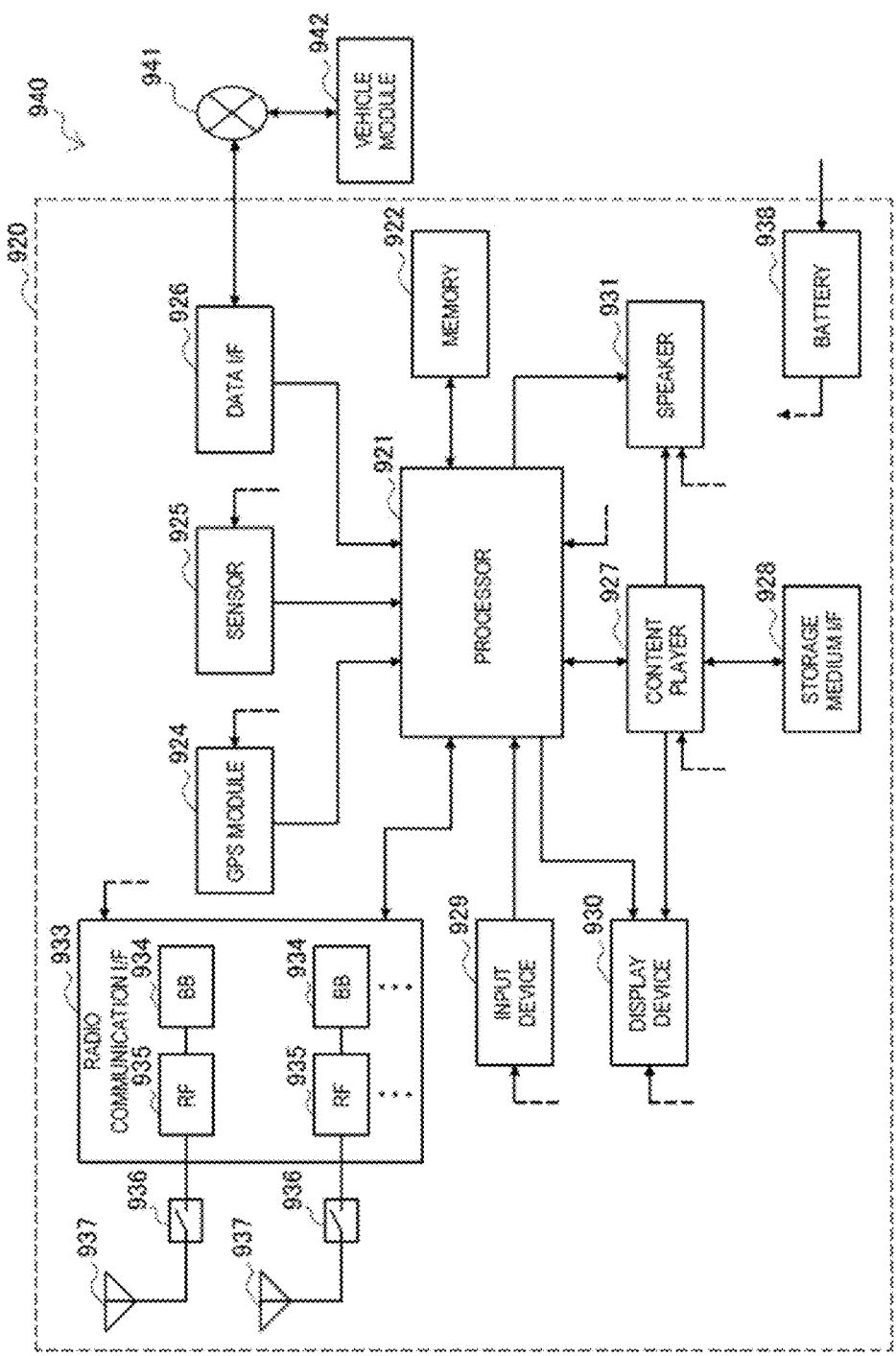
FIG. 11 is a block diagram showing an example of a schematic configuration of a car navigation apparatus in which the technology according to the present disclosure may be applied.

FIG. 11 is a block diagram showing an example of a schematic configuration of a car navigation apparatus 920 in which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, a single or multiple antenna switches 936, a single or multiple antennas 937 and a battery 938.

The processor 921 may be for example a CPU or a SoC, and controls a navigation function and additional function of the car navigation apparatus 920. The memory 922 includes RAM and ROM, and stores programs executed by the processor 921 and data.

The GPS module 924 determines the location of the car navigation apparatus 920 (such as latitude, longitude and height) with a GPS signal received from a GPS satellite. The sensor 925 may include a group of sensors such as a gyroscope sensor, a geomagnetic sensor and an air pressure sensor. The data interface 926 is connected to for example an on-board network 941 via a terminal that is not shown, and acquires data generated by the vehicle (such as vehicle speed data).

The content player 927 reproduces contents stored in a storage medium (such as CD and DVD) which is inserted into the storage medium interface 928. The input device 929 includes for example a touch sensor, a button or a switch configured to detect touch on a screen of the display device 930, and receives an operation or information inputted by the user. The display device 930 includes a screen such as an LCD or OLED display, and displays an image of navigation function or the reproduced contents. The speaker 931 outputs voice of the navigation function or the reproduced contents.

The radio communication interface 933 supports any cellular communication scheme (such as LTE and LTE-advanced), and performs a wireless communication. The radio communication interface 933 may generally include for example a BB processor 934 and an RF circuit 935. The BB processor 934 may perform for example coding/decoding, modulation/demodulation and multiplexing/demultiplexing, and perform various types of signal processing for wireless communication. Meanwhile, the RF circuit 935 may include for example a frequency mixer, a filter and an amplifier, and transmit and receive a wireless signal via the antenna 937. The radio communication interface 933 may be a chip module on which the BB processor 934 and the RF circuit 935 are integrated. As shown in FIG. 11, the radio communication interface 933 may include multiple BB processors 934 and multiple RF circuits 935. Although FIG. 11 shows the example in which the radio communication interface 933 includes multiple BB processors 934 and multiple RF circuits 935, the radio communication interface 933 may include a single BB processor 934 or a single RF circuit 935.

In addition to the cellular communication scheme, the radio communication interface 933 may support an another type of radio communication scheme, such as a short-distance wireless communication scheme, a near field communication scheme and a wireless local area network (LAN) scheme. In this case, the radio communication interface 933 may include a BB processor 934 and a RF circuit 935 for each of the radio communication schemes.

Each of the antenna switches 936 switches a connection destination of the antenna 937 between multiple circuits (such as circuits for different wireless communication schemes) included in the radio communication interface 933.

Each of the antennas 937 includes a single or multiple antenna elements (such as multiple antenna elements included in the MIMO antenna), and is for the radio communication interface 933 to transmit and receive a wireless signal. As shown in FIG. 11, the car navigation apparatus 920 may include multiple antennas 937. Although FIG. 11 shows the example in which the car navigation apparatus 920 includes multiple antennas 937, the car navigation apparatus 920 may include a single antenna 937.

In addition, the car navigation apparatus 920 may include antennas 937 for different radio communication schemes. In this case, the antenna switch 936 may be omitted in the configuration of the car navigation apparatus 920.

The battery 938 supplies power to the blocks of the car navigation apparatus 920 shown in FIG. 11 via a feeder line. The feeder line is partially shown with a dash line in the drawing. The battery 938 accumulates the power supplied from the vehicle.

In the car navigation apparatus 920 shown in FIG. 11, the transceiving unit 202 described in conjunction with FIG. 4 can be implemented by the radio communication interface 933. At least a portion of the functions of the transceiving unit 202 may be implemented by the processor 921. For example, the processor 921 may determine the sequence number of the reference signal by performing the function of the determination unit 201.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, for example, the determination unit, generation unit, division unit and the like of the above devices may be implemented by one or more processors, while the notification unit, transceiving unit and the like may be implemented by circuit components such as antennas, filters, modems, and codecs.

Therefore, an electronic device (1) is further provided according to the present disclosure. The electronic device (1) includes circuitry configured to: determine dynamically, based on transmission characteristics related to a user equipment, a reference signal to be used by the user equipment from a set of available reference signals of a base station; and generate reference signal configuration information for the user equipment, with the configuration information containing an indication of a sequence number of the reference signal to be used by the user equipment, where the sequence number of the reference signal is associated with a sequence number of an antenna port.

An electronic device (2) is further provided according to the present disclosure. The electronic device (2) includes circuitry configured to: determine, based on reference signal configuration information for the user equipment from a base station, a sequence number of a reference signal to be used by the user equipment; and transmit and receive the reference signal based an antenna port associated with the sequence number of the reference signal.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1200 shown in FIG. 12) from a storage medium or network, wherein the computer is capable of implementing various functions when installed with various programs.

Figure 12:
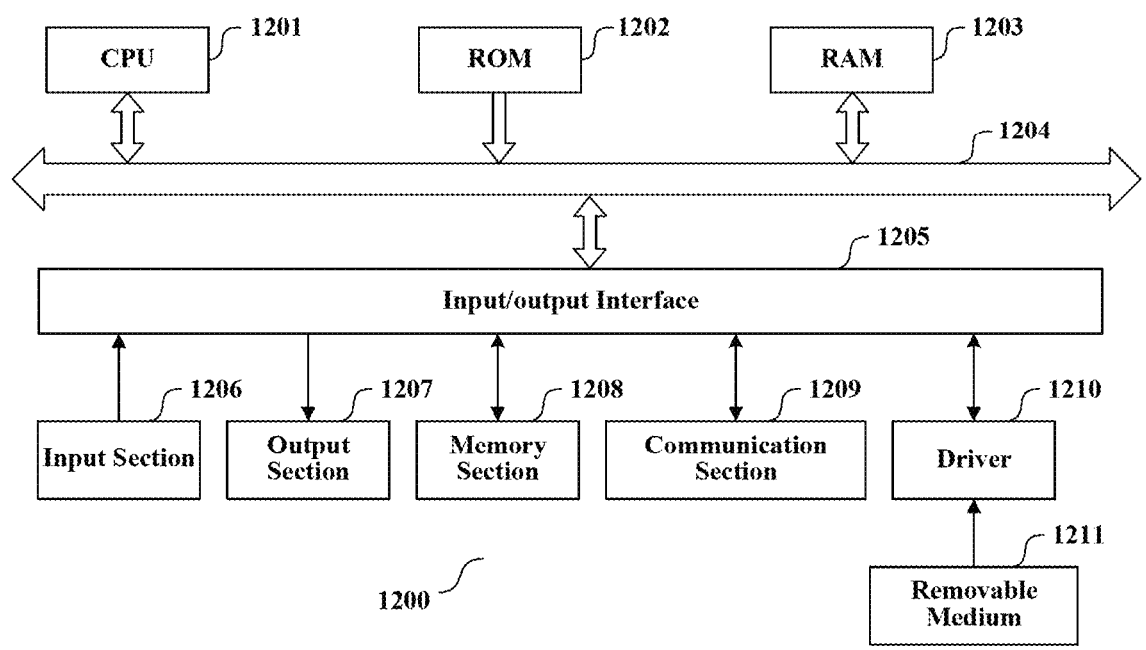
FIG. 12 is an exemplary block diagram illustrating the structure of a general purpose personal computer capable of realizing the method and/or device and/or system according to the embodiments of the present invention.

In FIG. 12, a central processing unit (CPU) 1201 executes various processing according to a program stored in a read-only memory (ROM) 1202 or a program loaded to a random access memory (RAM) 1203 from a memory section 1208. The data needed for the various processing of the CPU 1201 may be stored in the RAM 1203 as needed. The CPU 1201, the ROM 1202 and the RAM 1203 are linked with each other via a bus 1204. An input/output interface 1205 is also linked to the bus 1204.

The following components are linked to the input/output interface 1205: an input section 1206 (including keyboard, mouse and the like), an output section 1207 (including displays such as a cathode ray tube (CRT), a liquid crystal display (LCD), a loudspeaker and the like), a memory section 1208 (including hard disc and the like), and a communication section 1209 (including a network interface card such as a LAN card, a modem and the like). The communication section 1209 performs communication processing via a network such as the Internet. A driver 1210 may also be linked to the input/output interface 1205, if needed. If needed, a removable medium 1211 such as a magnetic disc, an optical disc, a magnetic optical disc and a semiconductor memory may be installed in the driver 1210, so that the computer program read therefrom is installed in the memory section 1208 as appropriate.

In the case where the foregoing series of processing is achieved with software, programs forming the software are installed from a network such as the Internet or a storage medium such as the removable medium 1211.

It should be appreciated by those skilled in the art that the storage medium is not limited to the removable medium 1211 shown in FIG. 12, which has program stored therein and is distributed separately from the apparatus so as to provide the programs to users. The removable medium 1211 may be, for example, a magnetic disc (including floppy disc (registered trademark)), a compact disc (including compact disc read-only memory (CD-ROM) and digital versatile disc (DVD)), a magneto optical disc (including mini disc (MD) (registered trademark)), and a semiconductor memory. Alternatively, the memory medium may be the hard discs included in ROM 1202 and the memory section 1208 in which programs are stored, and can be distributed to users along with the device in which they are incorporated.

To be further noted, in the device, method and system according to the present disclosure, the respective components or steps can be decomposed and/or recombined. These decompositions and/or recombinations shall be regarded as equivalent solutions of the present disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n)" in which an element is defined will not preclude presence of an additional identical element(s) in a process, method, article or device including the defined element(s) unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A device at a user equipment (UE) side for wireless communications, the device comprising:
   at least one processor; and
   at least one memory including computer program code, where the at least one memory and the computer program code are configured, with the at least one processor, to cause the device to at least:
   transmit, to a base station, information of beam direction between the base station and the UE;
   receive, from the base station, reference signal configuration for the UE determined by the base station based on the information of beam direction, the reference signal configuration indicating selected downlink reference signals and associated resource elements for the selected downlink reference signals, the selected downlink reference signals being transmitted to the UE via beams with different beam directions;
   determine, based on the reference signal configuration for the UE, the selected downlink reference signals and the associated resource elements, the selected downlink reference signals and the associated resource elements being associated with antenna ports; and
   receive and measure the selected downlink reference signals using the antenna ports on the associated resource elements.

2. The device according to claim 1, wherein the reference signal configuration for the UE includes an indication of sequence numbers of the selected downlink reference signals.

3. The device according to claim 2, wherein a sequence number of one of the selected downlink reference signals is associated with a sequence number of one of the antenna ports.

4. The device according to claim 1, wherein the at least one memory including the computer program code is configured with the at least one processor to cause the device to perform a channel status measurement or channel estimation based on the selected downlink reference signals.

5. The device according to claim 1, wherein the selected downlink reference signals are beam-formed reference signals that are subject to a beam-forming processing.

6. The device according to claim 1, wherein the different beam directions correspond to downlink reference signals having different sequence numbers.

7. The device according to claim 1, wherein the reference signal configuration is formed in a bitmap, with each bit in the bitmap indicating whether a corresponding downlink reference signal is to be used or not.

8. The device according to claim 7, wherein a number of bits in the bitmap is equal to a number of available downlink reference signals or a number of antenna ports.

9. The device according to claim 1, wherein available downlink reference signals are divided into multiple subsets, and the reference signal configuration includes sequence numbers of the subsets where the selected downlink reference signals are located and sequence numbers of the selected downlink reference signal in the subsets.

10. A device at a base station side for wireless communications, the device comprising:
    at least one processor; and
    at least one memory including computer program code, where the at least one memory and the computer program code are configured, with the at least one processor, to cause the device to at least:
    receive, from a user equipment (UE), information of beam direction between the base station and the (UE);
    determine a reference signal configuration for the UE based on the information of beam direction, the reference signal configuration indicating a selected downlink reference signals and associated resource elements for the selected downlink reference signals, the selected downlink reference signals being transmitted to the UE via beams with different beam directions;
    transmit, to the UE, the determined reference signal configuration for the UE; and
    transmit the selected downlink reference signals with the associated resource elements on antenna ports to the UE, the selected downlink reference signals and the associated resource elements being associated with the antenna ports.

11. The device according to claim 10, wherein the different beam directions correspond to downlink reference signals having different sequence numbers.

12. The device according to claim 10, wherein the reference signal configuration is formed in a bitmap, with each bit in the bitmap indicating whether a corresponding downlink reference signal is to be used or not.

13. The device according to claim 12, wherein a number of bits in the bitmap is equal to a number of available downlink reference signals or a number of antenna ports.

14. The device according to claim 10, wherein the selected downlink reference signals are beam-formed reference signals that are subject to beam-forming processing.

15. The device according to claim 10, wherein the reference signal configuration for the UE includes an indication of a sequence number of the selected downlink reference signals.

16. The device according to claim 15, wherein a sequence number of one of the selected downlink reference signals are associated with a sequence number of one of the antenna ports.

17. The device according to claim 10, wherein available downlink reference signals are divided into multiple subsets, and the reference signal configuration includes sequence numbers of the subsets where the selected downlink reference signals are located and sequence numbers of the selected downlink reference signals in the subsets.

18. A method of operating a device at a user equipment (UE) side for wireless communications, the method comprising:

transmitting, to a base station, information of beam direction between the base station and the UE;

receiving, from the base station, reference signal configuration for the UE determined by the base station based on the information of beam direction, the reference signal configuration indicating selected downlink reference signals and associated resource elements for the selected downlink reference signals, the selected downlink reference signals being transmitted to the UE via beams with different beam directions;

determining, based on the reference signal configuration for the UE, the selected downlink reference signals and the associated resource elements, the selected downlink reference signals and the associated resource element being associated with antenna ports; and receiving and measuring the selected downlink reference signals using the antenna ports on the associated resource elements.

19. The method according to claim 18, wherein the reference signal configuration for the UE includes an indication of sequence numbers of the selected downlink reference signals.

20. The method according to claim 19, wherein a sequence number of one of the selected downlink reference signals is associated with a sequence number of one of the antenna ports.

* * * * *